United States Patent
Morita et al.

(10) Patent No.: US 7,764,465 B2
(45) Date of Patent: Jul. 27, 2010

(54) THIN-FILM MAGNETIC HEAD WITH A SPIRAL RECORDING COIL HAVING A FIRST PART WITH A DENSER PITCH CLOSER TO THE MEDIUM FACING SURFACE THAN A SECOND COIL PART AND ALL SET BETWEEN A PAIR OF MAGNETIC LAYERS

(75) Inventors: Sumihito Morita, Niigata-ken (JP); Kiyoshi Kobayashi, Niigata-ken (JP); Toru Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 690 days.

(21) Appl. No.: 11/692,046

(22) Filed: Mar. 27, 2007

(65) Prior Publication Data

US 2007/0230041 A1  Oct. 4, 2007

(30) Foreign Application Priority Data

Mar. 28, 2006  (JP) .............................. 2006-088174

(51) Int. Cl.
*G11B 5/17* (2006.01)
(52) U.S. Cl. ............................ 360/123.07; 360/123.09; 360/123.16; 360/123.21; 360/123.29; 360/123.33
(58) Field of Classification Search ............ 360/123.07, 360/123.08, 123.09, 123.16, 123.21, 123.25, 360/123.29, 123.33, 123.42, 123.46, 123.54
See application file for complete search history.

(56) References Cited

U.S. PATENT DOCUMENTS 6,842,307 B2 * 1/2005 Sasaki et al. ........... 360/123.21

| | | | |
|---|---|---|---|
| 2002/0048115 A1 | 4/2002 | Sasaki et al. | |
| 2003/0189789 A1 | 10/2003 | Kobayashi | |
| 2005/0047015 A1 | 3/2005 | Matono et al. | |
| 2005/0195526 A1 | 9/2005 | Hirabayashi et al. | |

FOREIGN PATENT DOCUMENTS

| | | |
|---|---|---|
| JP | 2001-060307 | 3/2001 |
| JP | 2003-303405 | 10/2003 |
| JP | 2004-362660 | 12/2004 |
| JP | 2005-078706 | 3/2005 |
| JP | 2005-285306 | 10/2005 |

* cited by examiner

*Primary Examiner*—A. J. Heinz
(74) *Attorney, Agent, or Firm*—Brinks Hofer Gilson & Lione

(57) ABSTRACT

A thin-film magnetic head is capable of securing an insulating property and minimizing the projection of a recording element section due to heat expansion. The thin-film magnetic head includes a pair of magnetic layers disposed with a predetermined gap therebetween on a surface facing a recording medium. The layers are connected to each other along an inner part in a height direction from the medium-facing surface. A spiral recording coil is disposed between the pair of magnetic layers and wound around a connecting portion of the pair of magnetic layers. The recording coil includes a dense coil portion formed with a pitch smaller than that of the inner part in the height direction so as to be closer to the medium-facing surface than the connecting portion. An organic insulating layer is locally formed to fill coil gaps of the dense coil portion, and coil gaps other than those of the dense coil portion are filled with an inorganic insulating layer.

5 Claims, 5 Drawing Sheets

THIN-FILM MAGNETIC HEAD WITH A SPIRAL RECORDING COIL HAVING A FIRST PART WITH A DENSER PITCH CLOSER TO THE MEDIUM FACING SURFACE THAN A SECOND COIL PART AND ALL SET BETWEEN A PAIR OF MAGNETIC LAYERS

This application claims the benefit of Japanese Patent Application No. 2006-088174 filed Mar. 28, 2006, which is hereby incorporated by reference.

BACKGROUND

1. Field

The present invent relates to a thin-film magnetic head including a spiral recording coil.

2. Related art

It is commonly known that a thin-film magnetic head facing a recording medium with a predetermined gap therebetween in a recording medium-facing surface includes a recording element section which has a pair of magnetic layers connected to each other on in inner part in a height direction relative to the medium-facing surface. Such devices include a recording coil configured to induce a recording magnetic field in the pair of magnetic layers, and a magnetic gap layer is located between the pair of magnetic layers in the medium-facing surface. The device records magnetic data on a recording medium by using a leaked magnetic field from the pair of magnetic layers. Recently, the yoke length of the recording coil has been decreased with an increase in recording density requiring a very tight pitch in the coil and a high aspect ratio needed to decease coil resistance. As the result, since an inorganic insulating material does not perfectly fill a coil gap of the recording coil when the recording coil is insulated using the inorganic insulating material such as alumina, voids of the material occur. It is known to fully cover the recording coil with an organic insulating material (resist) having fluidity to completely insulate each coil gap.

Known examples are disclosed in: Japanese Unexamined Patent Application Publication Nos. 2003-303405 (US Pub. 2003189789A1) and 2001-60307 (US Pub. 2002048115A1)

However, the resist expands by heat generating by the recording coil and projects the recording element section toward the recording medium because the resist has a high heat expansion coefficient. If the recording element section is projected, there is increased risk that the recording element section can scratch the recording medium or become damaged due contacting the recording medium.

SUMMARY

It is an object of the present invention to provide a thin-film magnetic head capable of securing an insulating proper and minimizing a projection of a recording element section due to heat expansion.

The invention considers several factors to minimize heat expansion in a recording element section. An inorganic insulating material having a lower heat expansion coefficient than a resist may be used.

Specifically, a thin-film magnetic head includes a pair of magnetic layers disposed with a predetermined gap therebetween on a surface facing a recording medium and connected to each other along an inner part in a height direction from the medium-facing surface. A spiral recording coil is disposed between the pair of magnetic layers and is wound around a connecting portion of the pair of magnetic layers. The recording coil includes a dense coil portion formed with a pitch smaller than that of the inner part in the height direction so as to be closer to the medium-facing surface than the connecting portion. An organic insulating layer is locally formed to fill coil gaps of the dense coil portion, and coil gaps other than those of the dense coil portion are filled with an inorganic insulating layer.

An aspect ratio t/w of the dense coil portion is 1 or more, where a thickness of the recording coil is defined as t and a pitch of the recording coil is defined as w. Preferably, the organic insulating layer is formed in an area where an aspect ratio t/w of the recording coil is 1 or more and the inorganic insulating layer is formed in an area where the aspect ratio t/w of the recording coil is less than 1. In other words, it is preferable that the organic insulating layer is formed in a fan shape of which a size in a track width direction increases toward the medium-facing surface.

To prevent an increase in a coil resistance, the recording coil layer is formed so that a sectional area in the inner part in the height direction from the connecting portion of one pair of the magnetic layers is larger than a sectional area of the medium-facing surface side.

According to the inventor, there is provided the thin-film magnetic head capable of securing an insulating property and minimizing a projection of a recording element section by a heat expansion.

DRAWINGS

DESCRIPTION

Hereinafter, the present invention will be described with reference to the drawings. It is defined that an X direction is a track width direction, a Y direction is a height direction, and a Z direction is a moving direction of a recording medium and a laminating direction of each layer forming a thin-film magnetic head.

Figure 1:
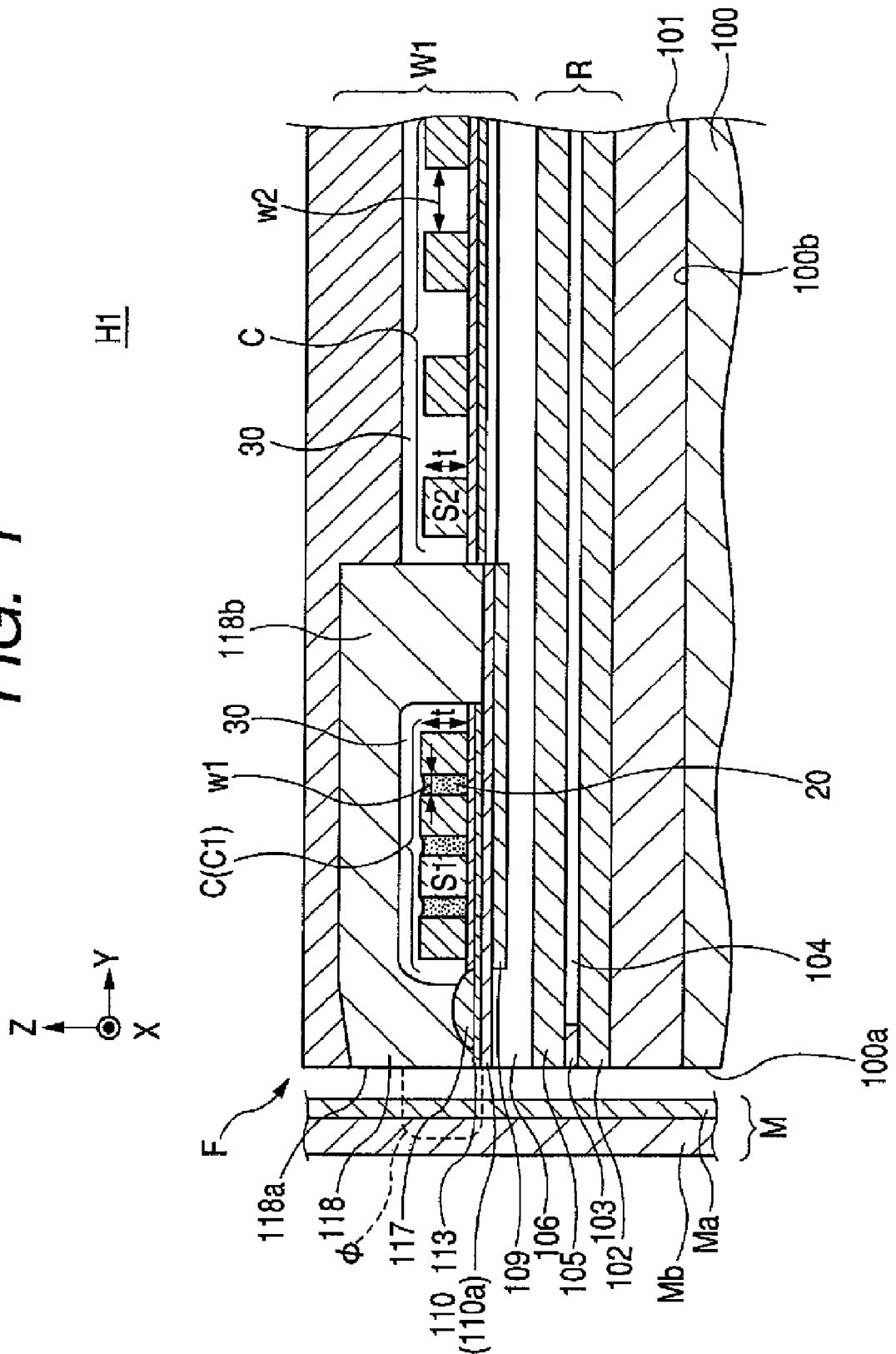
FIG. 1 is a sectional view illustrating a laminating structure of a thin-film magnetic head in a vertical magnetic recording method according to the present invention.

FIG. 1 is a partial sectional view illustrating a laminating structure of a tin-film magnetic head H1 in a section of a device center according to an embodiment of the present invention. The thin-film magnetic head H1 is a vertical magnetic recording head including a recording section W1 and a reproducing section R formed by laminating thin film on a tray ring side section 100b of a slider 100. The reproducing section R reads a magnetic data from a recording medium M by using a magnetic resistance effect. The recording section W1 performs a recording operation by applying vertical magnetic filed Φ to the recording medium M so as to vertically magnetize a hard film Ma of the recording medium M.

The recording medium M includes the hard film Ma disposed on a medium surface, and a soft film Mb having a high magnetic permeability and disposed on more inner part than the hard film Ma The recording medium M is disk-shape, and rotates about the center of the disk to define a spin axis. The slider 100 is formed of a non magnetic material such as $Al_2O_3$ and TiC. A medium-facing surface 100a of the slider 100 faces the recording medium M. The slider 100 is levitated away from the recoding medium M by air flow as the recording medium M spins.

A protective layer 101 is formed of a non magnetic material such as $Al_2O_3$ or $SiO_2$ on the tray ring side section 100b of the slider 100. The reproducing section R is formed on the protective layer 101. The reproducing section R includes a lower shield layer 102, an upper shield layer 105, a gap insulating layer 104 filling a gap between the lower shield layer 102 and upper shield layer 105, and a reproducing element 103 located in the gap insulating layer 104. The reproducing element 103 is a magneto-resistance element such as AMR, GMR, and TMR.

The recording section W1 is laminated on the upper shield layer 105 with an insulating layer 106 made of alumina, $Si)_2$, or the like interposed therebetween. The recording section W1 includes a pair of magnetic layers, namely a main magnetic pole layer 110 and an auxiliary magnetic pole layer (return yoke layer) 118, which face each other. A predetermined gap is interposed between the layers on a facing surface opposite to the recording medium, hereinafter, referred to as a medium-facing surface F. Also included is an auxiliary yoke layer 109 magnetically functioning as a part of main magnetic pole layer 110, a magnetic gap layer 113 interposed between the main magnetic pole layer 110 and the auxiliary magnetic pole layer 118 in a part of the medium-facing surface, and a recording coil C configured to apply a recording magnetic field to the main magnetic pole layer 110 and the auxiliary magnetic pole layer 118.

The auxiliary yoke layer 109 is formed of a magnetic material having a saturation magnetic flux density lower than the main magnetic pole layer 110 just under the main magnetic pole layer 110. The main magnetic pole layer 110 is formed on a planar surface made of the auxiliary yoke layer 109 and the insulating layer 106 with a coated foundation layer interposed therebetween. The main magnetic pole layer 110 has a predetermined length in an illustrated Y direction from the medium-facing surface F, whereby a size in an illustrated X direction of apical surface 110a exposed on the medium-facing surface F is defined as a recording track width Tw. The main magnetic pole layer 110 is made of a ferromagnetic material such as Ni—Fe, Co—Fe, and Ni—Fe—Co having a high saturation magnetic flux density.

The magnetic gap layer 113 is formed on the insulating material layer filling both sides of the main magnetic pole layer 110 in the illustrated X direction and a rear side in the illustrated Y direction. The insulating layer is made of a non magnetic material such as $Al.sub.2O.sub.3$ and $SiO.sub.2$. The magnetic gap layer 113 is made of a non magnetic material such as $M.sub.2O.sub.3$, $SiO.sub.2$, Au, and Ru. A throat height determining layer 117 is formed of an organic or an inorganic material on the magnetic gap layer 113 at predetermined distance away from the facing surface F. The throat height of the thin-film magnetic head H1 is determined by a distance from the medium-facing surface F to a front edge of the throat height determining layer 117.

The auxiliary magnetic pole layer 118 is formed of ferromagnetic material such as a permalloy from an upper side of the magnetic gap layer 113 and throat height determining layer 117 to an inner part in the height direction. The auxiliary magnetic pole layer 115 is disposed so as to face the main magnetic pole layer 110 with a predetermined gap interposed therebetween on the apical surface 118a exposed to the medium-facing surface F. The auxiliary magnetic pole layer 118 is connected to the main magnetic pole layer 110 in the connecting portion 118b located in an inner part in a height direction from the medium-facing surface F. A planar size (yoke length) of the auxiliary magnetic pole layer 118 is set to a minimum value so as to correspond to an increase in recording density. This is done to suppress noise when a frequency of a recording current is high. An upper surface of the auxiliary magnetic pole layer 118 is covered by a surface protective layer 120.

The recording coil C is interposed between the main magnetic pole layer 110 and the auxiliary magnetic pole layer 118, and the coil is a spiral planar coil wound around the connecting portion 118b of the auxiliary magnetic pole layer 118. The recording coil C is formed of non magnetic metals of not less than one or two kinds selected from such as Au, Ag, Pt, Cu, Cr, Al, Ti, Ni, NiP, Mo, Pd, and Rh.

Figure 2:
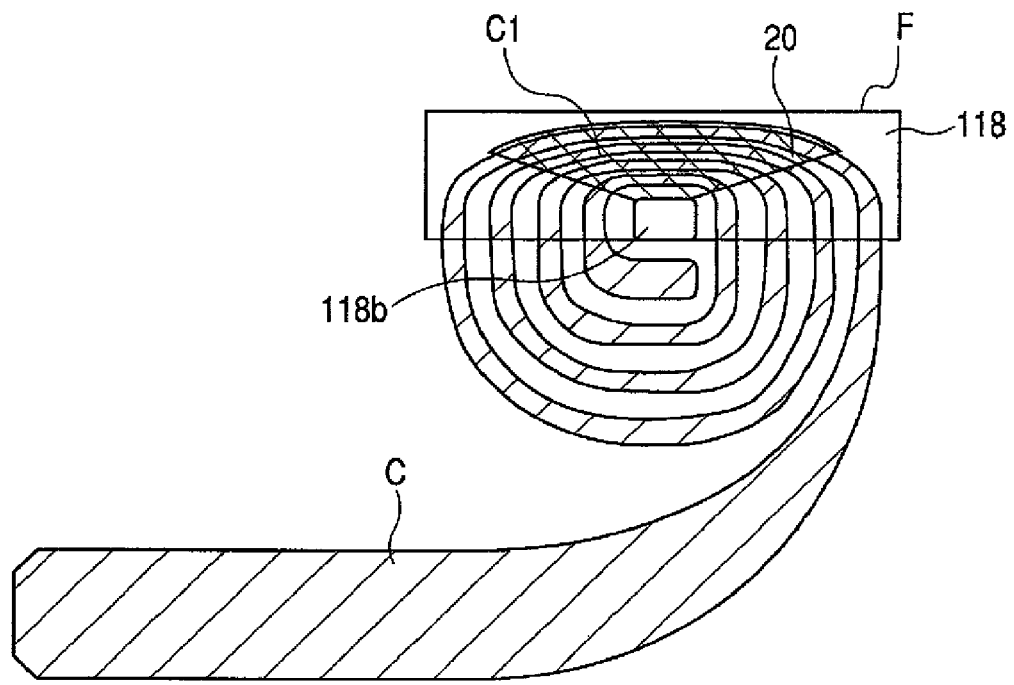
FIG. 2 is a top view of a recording coil (thickness t=1.5 μm).
Figure 3:
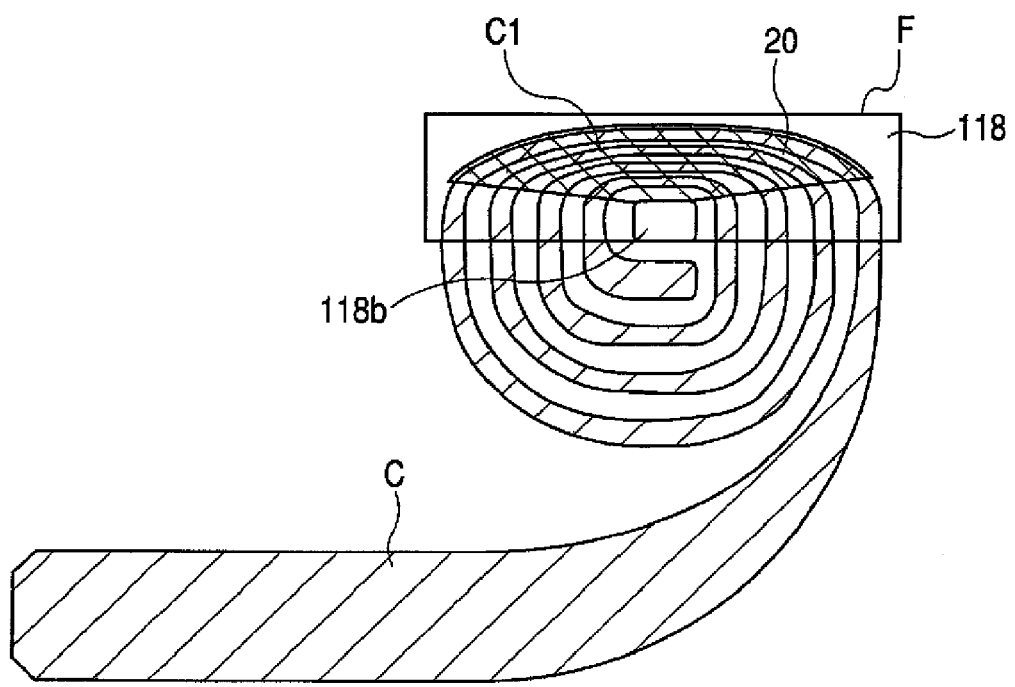
FIG. 3 is a top view of a recording coil (thickness t=2.5 μm).

Referring to FIG. 1 to FIG. 3 the recording coil C and an adjacent structure of the coil will be described.

The FIG. 2 and FIG. 3 are top views illustrating the recording coil C seen from above. The recording coil C as mentioned above is wound around the connecting portion 118b of the auxiliary magnetic pole layer 118, which is configured as a base point. A dense coil portion C1 is formed in the medium-facing surface F side Thom the connecting portion 118b since the coil pitch w (w1, w2) is different in the medium-facing surface side than in the inner part in height direction from the connecting portion 118b. A size of an area forming the dense coil portion C1 is different in accordance with a thickness t (the thickness is fixed) of the recording coil C, therefore the larger coil thickness t, the larger the size becomes, as shown in FIG. 2 and FIG. 3. FIG. 2 is illustrated that the coil thickness is 1.5 μm, and FIG. 3 is illustrated that the coil thickness is 2.5 μm. The coil thickness t is property configured.

The dense coil portion C1 is formed of a plurality of curved coil lines of which the coil pitch w is narrower than the inner part in the height direction. The plurality of coil lines each have an aspect ratio t/w (t: coil thickness, w: coil pitch), where the pitch is larger than 1, and the as a coil line approaches from the connecting portion 118b to medium-facing surface F, the track width becomes wider. The coil pitch w1 of the dense coil portion C1 is determined by the yoke length. Therefore, recently, the coil pitch w1 of the dense coil portion C1 is decreased in size since the yoke length is configured in small size for increasing a recording density.

As shown in FIG. 1, the recording coil C is formed so that a sectional area S2 of a coil line located in the inner part in the height direction is larger than a sectional area S1 of a coil line of the dense coil portion C1. A total length of the recording coil C is increased in a case where the winding the coil lime uses the regular coil pitch w1 because the coil pitch w2 in the inner part in the height direction is formed to be larger than the coil pitch w1 of the dense coil portion C1. However an increase in a series electric resistance of the recording coil C is suppressed by forming the sectional area S2 in the inner part in the height direction to be larger. A heating value of the recording coil C is suppressed when the coil resistance of the recording coil C is suppressed. Therefore a heat expansion of the recording section W1 can be minimized.

In the recording coil C, coil gaps of the dense coil portion C1 are completely filled with an organic insulating layer 20 such as resist having flexibility at the time of forming. The organic insulating layer 20 is locally formed just on the dense coil portion C1, and an area of the dense coil portion C1 coincides with a formation area of the organic insulating layer 20 in the embodiment. Otherwise, coil gaps other than those of the dense coil portion C1, specifically the area where the aspect ratio t/w of recording coil C is 1 or less, are filled with an inorganic insulating layer 30 such as alumina and $SiO_2$. The inorganic insulating layer 30 is overall formed on the recording coil C by using a sputtering method after the organic insulating layer 20 is coated on the coil gaps of the dense coil portion C1 in the recording coil C. The inorganic insulating layer 30 not only fills the coil gaps other than the dense coil portion C1, but also is formed to cover an upper surface of the recording coil C. An upper surface of inorganic insulating layer 30 is planarized by a CUP process.

Herein, it is known that it is possible to form an inorganic insulating layer 30 which completely fills the coil gaps of the recording coil C without any voids when the aspect ratio t/w of the recording coil C is 1 or less.

Figure 4:
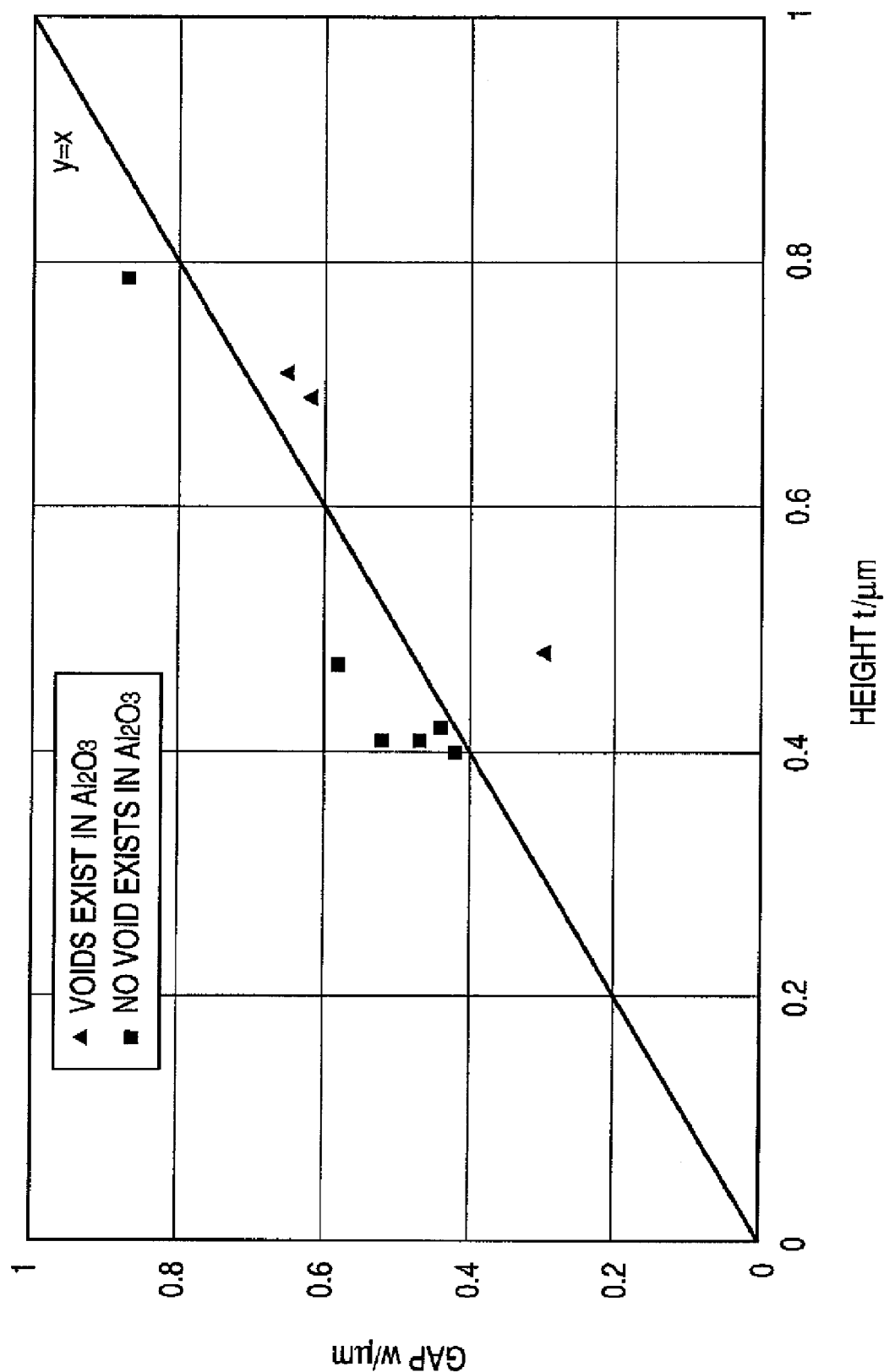
FIG. 4 is a graph illustrating a relation with a thickness and a coil pitch of a recording coil, and a deposition state of an inorganic insulating layer sputtered in coil gaps of the recording coil.

FIG. 4 illustrates a deposition state when the recording coil C is formed with a different thickness t and a different coil pitch w is provided, and the inorganic insulating layer is sputtered in the coil gaps of the recording coil C in the same condition. In FIG. 4, a sign of ▲ denotes that a void is not formed in the coated inorganic insulating layer 30, and a sign of ■ denotes that voids are present in the coated inorganic insulating layer 30. As shown in FIG. 4, in case that the aspect ratio t/w of the recording coil C is 1 or more, the insulation among the coil gaps is insufficient because the voids occurred in the inorganic insulating layer 30. In case that the aspect ratio t/w of the recording coil C is less than 1, the coil gaps are entirely filled with the inorganic insulating layer 30. Additionally, if the aspect ratio t/w of the recording coil C is small, the inorganic insulating layer 30 is possible to fine perform a deposition, but if the coil pitch w1 near the medium-facing surface F side is set to be large, the yoke length should be set to be large. As the result, increasing recording density is problematic.

It is well known that, the organic insulating layer 20 formed of such as a resist has a larger heat expansion coefficient than the inorganic insulating layer 30, such as that formed of an alumina. Accordingly, when the organic insulating layer 20 and the inorganic insulating layer 30 functioning of the insulating layer filling the coil gaps of the recording coil C are used differently than in the embodiment the area covered with the organic insulating layer 20 becomes smaller than when the recording coil C is entirely covered with organic insulating materials. Therefore, heat expansion of the recording section W1 can be reduced. When the formation area of the organic insulating layer 20 is defined by the aspect ratio t/w of the recording coil C with reference to the aforementioned experimental knowledge, the heat expansion of the recording section W1 can be more efficiently reduced because the formation area of organic insulating layer 20 can be suppressed to the minimum. Accordingly, it is possible to secure the insulating property of the recording coil C and suppress the projection of the recording section W1. As shown in FIG. 2 and FIG. 3, the formation area of the organic insulating layer 20 can be suppressed to the minimum since a lateral end of the coil gap of the organic insulating layer 20 has a continuous uneven shape. It is also allowed that a lateral end of the coil gap of the organic insulating layer 20 has a straight line shape as shown in FIG. 6 and FIG. 7.

The recording coil C is formed as a single layered structure in the embodiment but it is also possible to apply to a recording coil of a multi layered structure formed to laminate a plurality of coil layers. When the invention is applied to a recording coil of a multi layered structure, the invention may be applied to each coil layer of a recording coil and any layer thereof.

Figure 5:
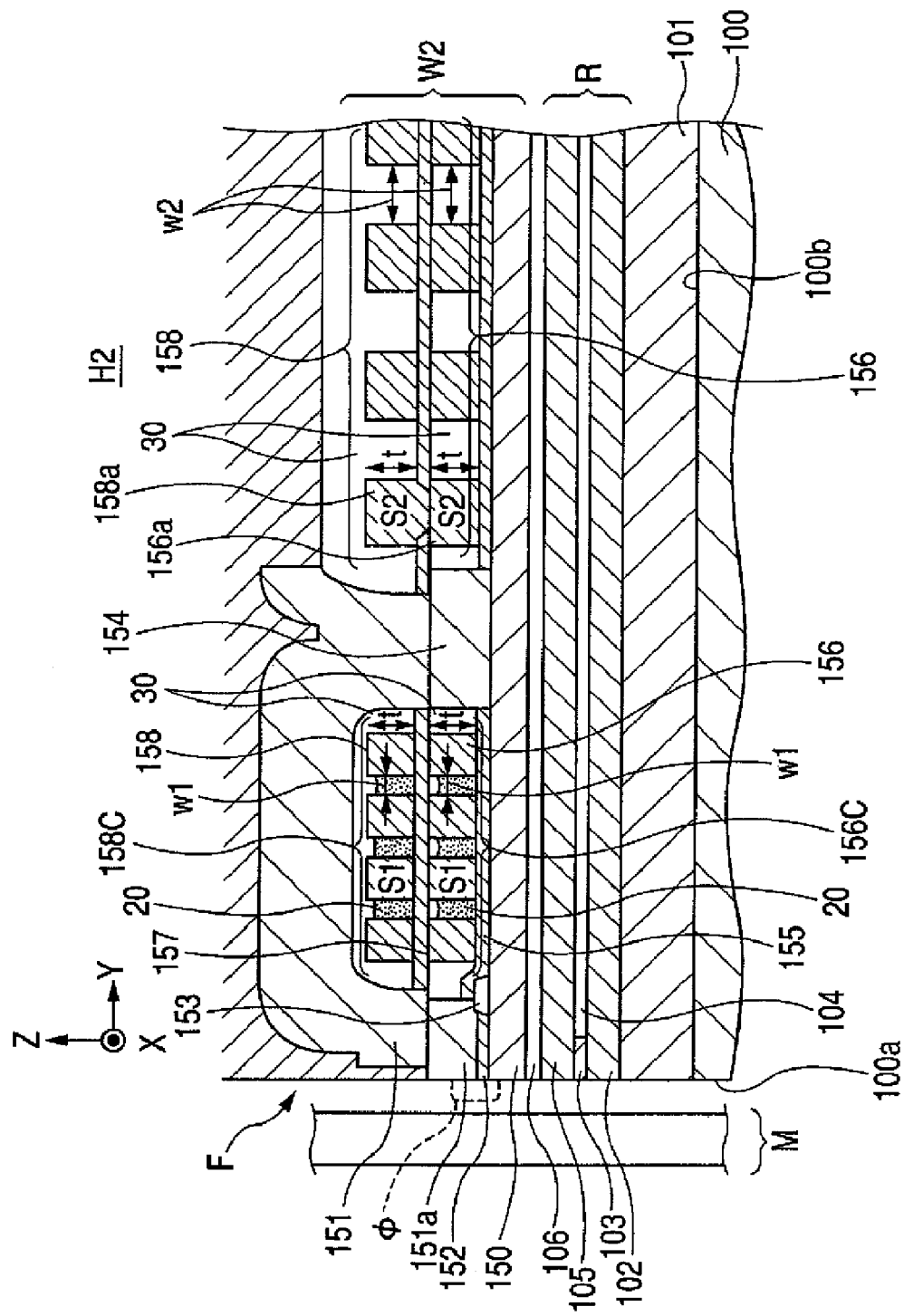
FIG. 5 is a sectional view illustrating a laminating structure of a thin-film magnetic head in a longitudinal magnetic recording method according to the invention.
Figure 6:
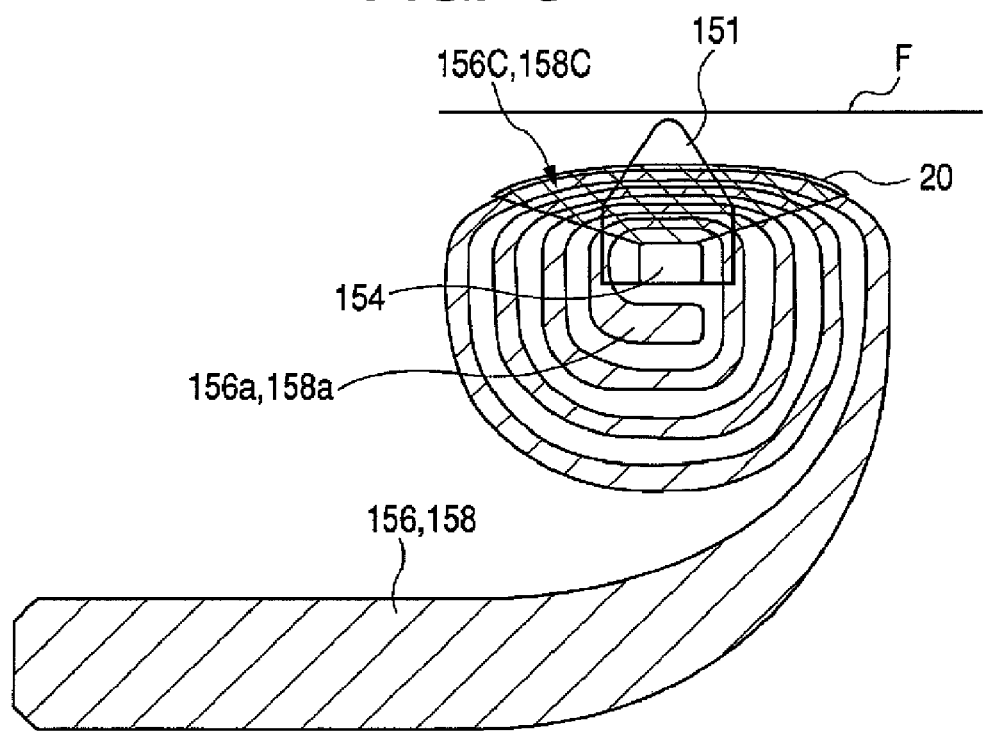
FIG. 6 is a top view of a recording coil (thickness A=1.5 μm).
Figure 7:
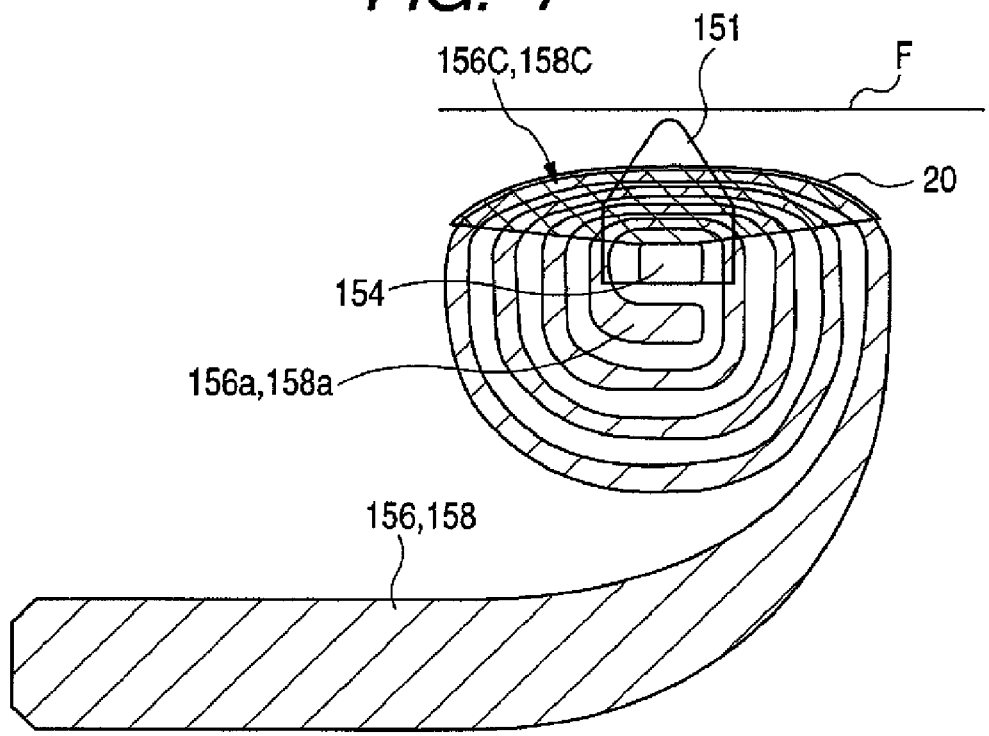
FIG. 7 is a top view of a recording coil (thickness t=2.5 μm).

A thin-film magnetic head H2 is illustrated in FIG. 5 to FIG. 7 according to the second embodiment. The thin-film magnetic head H2 of the second embodiment includes a recording section W2 of a longitudinal recording method. A configuration other than a configuration including the recording section W2 of the longitudinal recording method is the same as the first embodiment, and the same reference numerals as shown in FIG. 1 are used for similar components.

The recording section W2 is laminated on the upper shield layer 105 with an insulating layer 106 made of alumina $SiO_2$, or the like interposed therebetween. The recording section W2 includes a pair of magnetic layers (a lower core layer 150 and an upper core layer 151) facing each other with a predetermined gap interposed therebetween on a facing surface F opposite to the recording medium M. Also included is an upper magnetic pole layer 151a and a magnetic gap layer 152 interposing the lower core layer 150 between upper core layer 151. The lower core layer 150 and the upper core layer 151 is formed of a soft magnetic material such as permalloy. A gap depth layer 153 located in a backward in the height direction of the magnetic gap layer 152, and a magnetic connecting portion 154 located in a backward in the height diction from the gap depth layer 153, and magnetically connected between the lower core layer 150 and the upper core layer 151, are formed on the lower core layer 150. A gap depth of the thin-film magnetic head H2 is equal to a size in the height direction of the magnetic gap layer 152, and the size in the height direction of the magnetic gap layer 152 is determined by the gap depth layer 153. The magnetic gap layer 152 is anon magnetic material, and the gap depth layer 153 is formed of organic insulating material such as resist.

A recording coil of a double layer structure including a first coil layer 156 where a first coil is wound in a spiral shape and a second coil layer 158 where a second coil is reversely wound in a spiral shape about the wound direction of the first coil layer 156, around the magnetic connect portion 154 is formed on the lower core layer 150. The first coil 156 and the second coil 158 are formed of non magnetic metals of not less than one or two kinds selected from such as Au, Ag, Pt, Cu, Cr, Al, Ti, Ni, NiP, Mo, Pd, and Rh. The first coil layer 156 is interposed in a coil insulating foundation layer 155, and the second coil layer 158 is interposed in a coil insulating foundation layer 157. The first coil layer 156 and the second coil layer 158 are connected in wound center positions 156a and 158a.

Dense coil portions 156C and 158C are formed in the medium-facing surface F side from the wound center positions 156a and 158a since the coil pitches w (w1, w2) are different in the medium-facing surface F side and inner part in height direction from the wound center positions 156a and 158a in the first coil layer 156 and the second coil layer 158. A size of an area forming the dense coil portions 156C and 158C are different in accordance with a thickness t (the thickness is fixed) of the first coil layer 156 and the second coil layer 158, therefore the larger the coil thickness t, the larger its size becomes. A planar shape of the first coil layer 156 and the second coil layer 158 is almost same as the planar shape of the recording coil C in the first embodiment. FIG. 6 illustrates that the coil thickness is 1.5 μm, and FIG. 7 illustrates that the coil thickness is 2.5 μm. The coil thickness t can be properly configured.

The dense coil portions 156C and 158C are formed of a plurality of curved coil lines of which the coil pitch w is narrower than the inner part in the height direction. The plurality of coil lines have each aspect ratios t/w (t: coil thickness, w: coil pitch) which are larger than 1, and as the coil line approaches from the wound center positions 156a and 158a to medium-facing surface F; the track width size becomes wider. The coil pitch w1 of the dense coil portions 156C and 158C is determined by the yoke length. Therefore, recently, the coil pitch w1 of the dense coil portions 156C and 158C is decreased in size since the yoke length is configured in a small size for increasing a recording density.

As shown in FIG. 5, the first coil layer 156 and the second coil layer 158 are formed so that a sectional area S2 of a coil line located in the inner part in the height direction is larger than a sectional area S1 of a coil line of the dense coil portions 156C and 158C. A total length of the fit coil layer 156 and the second coil layer 158 is greater relative to the case where the coil line is wound by the regular coil pitch w1 because the coil pitch w2 in the inner part in the height direction is formed to be larger than the coil pitch w1 of the dense coil portions 156C and 158C. However, an increase in a series electric resistance of the first coil layer 156 and the second coil layer 158 is suppressed by forming the sectional area S2 in the inner part in height direction to be larger. A heating value of the first coil layer 156 and the second coil layer 158 is suppressed when the coil resistance of the first coil layer 156 and the second coil layer 158 is suppressed. Therefore a heat expansion of the recording section W2 can be minimized.

In the first coil layer 156 and the second coil layer 158, coil gaps of the dense coil portions 156C and 158C are completely filled with an organic insulating layer 20 such as resist having flexibility at the time of forming. The organic insulating layer 20 is locally formed just on the dense coil portions 156C and 158C, and areas of the dense coil portions 156C and 158C coincide with formation areas of the organic insulating layer 20 in the embodiment. Otherwise, coil gaps other than those of the dense coil portions 156C and 158C, specifically the areas where the aspect ratio t/w of first coil layer 156 and the second coil layer 158 is 1 or less, are filled with an inorganic insulating layer 30 such as alumina, and $SiO_2$. The inorganic insulating layer 30 is overall formed on the first coil layer 156 and the second coil layer 158 by using a sputtering method after the organic insulating layer 20 is coated on the coil gaps of the dense coil portions 156C and 158C in the first coil layer 156 and the second coil layer 158. The inorganic insulating layer 30 not only fills the coil gaps other than the dense coil portions 156C and 158C, but also is formed to cover an overall upper surface of the first coil layer 156 and the second coil layer 158. An upper surface of the inorganic insulating layer 30 is planarized by a CMP process. It is possible to form inorganic insulating layer 30 which perfectly fills the coil gaps of the first coil layer 156 and the second coil layer 158 without any void when the aspect ratio t/w of the first coil layer 156 and the second coil layer 158 is 1 or less.

According to the thin-film magnetic head H2 mentioned above, when the organic insulating layer 20 and the inorganic insulating layer 30 functioning of the insulating layer filling the coil gaps of the recording coil (the first coil layer 156 and the second coil layer 158) are differently used as the embodiment the area covering with the organic insulating layer 20 becomes smaller than a case that the recording coil is entirely covered with organic insulating materials.

Therefore, a heat expansion of the recording section W2 can be reduced. When the formation area of the organic insulating layer 20 is defined by the aspect ratio t/w of the recording coil with reference to the aforementioned experimental knowledge, the heat expansion of the recording section W2 can be efficiently reduced because the formation area of the organic insulating layer 20 can be minimized. As a result it is possible to secure the insulating property of the recording coil and suppress the projection of the recording section W2.

What is claimed is:

1. A thin-film magnetic head comprising:
   a pair of magnetic layers disposed with a predetermined gap therebetween on a surface facing a recording medium, the layers connected to each other along first inner part in a height direction from the medium-facing surface; and
   a spiral recording coil disposed between the pair of magnetic layers and wound around a connecting portion of the pair of magnetic layers,
   wherein the recording coil includes a dense coil portion formed with a pitch less than that of a second inner part in the height direction so as to be closer to the medium-facing surface than the connecting portion, the second inner part is positioned to an upper area in the height direction than that of the first inner part, and
   wherein an organic insulating layer is locally formed to fill coil gaps of the dense coil portion, and coil gaps other than those of the dense coil portion are filled with an inorganic insulating layer.

2. The thin-film magnetic head according to claim 1, wherein an aspect ratio t/w of the dense coil portion is 1 or more when a thickness of the recording coil is t and a pitch of the recording coil is w.

3. The thin-film magnetic head according to claim 1, wherein the organic insulating layer is formed in an area where an aspect ratio t/w of the recording coil is 1 or more and the inorganic insulating layer is formed in an area where the aspect ratio t/w of the recording coil is less than 1, when a thickness of the recording coil is t and a pitch of the recording coil is w.

4. The thin-film magnetic head according to claim 1, wherein the organic insulating layer is formed in a fan shape of which a size in a track width direction increases toward the medium-facing surface.

5. The thin-film magnetic head according to claim 1, wherein a sectional area of a layer of the recording coil in the first inner part in the height direction from the connecting portion of the pair of magnetic layers is larger than a sectional area of the layer close to the medium-facing surface side.

* * * * *